(12) United States Patent
Uchimura et al.

(10) Patent No.: US 9,308,899 B2
(45) Date of Patent: Apr. 12, 2016

(54) VEHICLE CONTROL SYSTEM

(75) Inventors: Yukiya Uchimura, Tokyo (JP);
Katsufumi Ichikawa, Tokyo (JP);
Tsuyoshi Nakano, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 1134 days.

(21) Appl. No.: 11/657,569

(22) Filed: Jan. 25, 2007

(65) Prior Publication Data

US 2007/0170775 A1    Jul. 26, 2007

(30) Foreign Application Priority Data

Jan. 26, 2006   (JP) .................................. 2006-017085
Jan. 31, 2006   (JP) .................................. 2006-022891

(51) Int. Cl.
*B60T 8/52*       (2006.01)
*B60T 7/10*       (2006.01)
*B60T 7/12*       (2006.01)
*B60T 13/74*      (2006.01)
*B60W 10/06*      (2006.01)
(Continued)

(52) U.S. Cl.
CPC . *B60T 7/107* (2013.01); *B60T 7/12* (2013.01); *B60T 7/122* (2013.01); *B60T 13/746* (2013.01); *B60W 10/06* (2013.01); *B60W 10/184* (2013.01); *B60W 30/18018* (2013.01); *F02N 11/0833* (2013.01); *B60W 2710/065* (2013.01); *F02N 2200/124* (2013.01); *Y02T 10/48* (2013.01)

(58) Field of Classification Search
CPC ..... B60T 7/122; B60T 7/107; B60T 2201/06; B60W 30/18018; B60W 10/182; B60W 2710/065

USPC .......................................................... 303/191
See application file for complete search history.

(56) References Cited

U.S. PATENT DOCUMENTS 4,648,289 A * 3/1987 Kubo et al. ..................... 477/93
6,308,129 B1 * 10/2001 Uchida ......................... 701/112
(Continued)

FOREIGN PATENT DOCUMENTS

DE    42 13 589 A1    11/1992
EP    1 469 195 A1    10/2004
(Continued)

OTHER PUBLICATIONS

European Search Report corresponding to European Patent Application No. 07101172.0 dated Jun. 5, 2007.

*Primary Examiner* — Xuan Lan Nguyen
(74) *Attorney, Agent, or Firm* — Smith, Gambrell & Russell, LLP (57) ABSTRACT

A brake control section can select an automatic mode in which a mechanical brake is automatically transitioned from a released state to a braking state in response to the running condition of a vehicle. A diagnostic section outputs a fail signal when an abnormal condition of the brake control section is detected. A power control section automatically stops a drive power source of the vehicle when the running condition of the vehicle satisfies a predetermined condition for determining a vehicle stop. When the automatic mode of the brake control section is released or when the diagnostic section outputs a fail signal of the brake control section, the power control section is inhibited to automatically stop the drive power source, so that an unintentional movement of the vehicle caused by an inclination of the road surface and the automatic stop of the drive power source can be prevented.

24 Claims, 8 Drawing Sheets (51) Int. Cl.
*B60W 10/184* (2012.01)
*B60W 30/18* (2012.01)
*F02N 11/08* (2006.01)

(56) References Cited

U.S. PATENT DOCUMENTS

2001/0013701 A1* 8/2001 Onoyama et al. ........... 290/40 C
2002/0108816 A1   8/2002 Taniguchi
2003/0137192 A1*  7/2003 Hano et al. .................... 303/192

FOREIGN PATENT DOCUMENTS

| | | |
|---|---|---|
| EP | 1 616 763 A2 | 1/2006 |
| JP | 2001-12269 | 1/2001 |
| JP | 2001-39278 | 2/2001 |
| JP | 2001-059435 | 3/2001 |
| JP | 2002-371876 | 12/2002 |
| JP | 2004-249992 | 9/2004 |

* cited by examiner

VEHICLE CONTROL SYSTEM

The present application claims each priority from Japanese Patent Application Nos. 2006-017085 and 2006-022891, the respective disclosures of which are incorporated herein by reference.

BACKGROUND OF THE INVENTION

1. Field of the Invention

The present invention relates to a vehicle control system which performs an automatic stop of a drive power source during a standstill of the vehicle and includes a mechanical brake driven by an actuator.

2. Description of the Related Art

Some vehicles such as automobiles are well known which are adapted to automatically stop (idle stop) the engine of the vehicle when the vehicle is stopped in order to improve fuel economy and reduce exhaust gas. One of the vehicles with such an idle-stop function is known to automatically activate an electric parking brake serving as a mechanical brake driven by an electric actuator during an idle stop in order to prevent unintentional movement of the vehicle due to an inclination of the road surface or the like when the engine is automatically stopped (e.g., see Japanese Patent Application Laid-Open Publication No. 2004-249992).

Also known is such a vehicle which employs a plurality of sensors to detect the presence of a brake manipulation by the driver in order to ensure that unintentional movement of the vehicle is prevented with the braking force of the foot brake during an idle stop (e.g., see Japanese Patent Laid-Open Publication No. 2001-12269). Such a vehicle with the idle-stop function is also known which includes a controller for controlling the fluid pressure for the foot brake and a sensor for detecting an abnormal fluid pressure condition (e.g., see Japanese Patent Application Laid-Open Publication No. 2001-39278).

Note that use of an electric parking brake for a braking operation during an idle stop of a vehicle typically causes a less reduction in braking force resulting from a reduction in fluid pressure as compared to the use of the foot brake. This eliminates the need for providing electric power all the time to maintain the braking force, thereby providing reductions in energy consumption and improvements in reliability.

However, when an idle stop is performed while the automatic mode is released in which the electric parking brake is automatically activated during a standstill of the vehicle, the vehicle may unintentionally start to move due to loss in creep force caused by the stop of the engine or due to reduction in braking force of the foot brake caused by the stop of the brake booster. On the other hand, if an idle stop is performed not only when the automatic mode is released but also when the electric parking brake is out of order for some reason, the electric parking brake being not activated may likely cause the vehicle to start to unintentionally move.

SUMMARY OF THE INVENTION

It is therefore an object of the present invention to provide a vehicle having a mechanical brake (e.g., an electric parking brake) with a vehicle control system which prevents unintentional movement of the vehicle due to an automatic stop of the drive power source, thereby providing improved reliability.

The present invention achieves the aforementioned object by the following solutions.

A first aspect of the present invention relates to a vehicle control system which includes a brake control section and a power control section. The brake control section controls an actuator to provide a transition between a braking state and a released state of a mechanical brake for applying braking force to drive wheels of a vehicle, and can select an automatic mode in which the mechanical brake is automatically transitioned from the released state to the braking state in response to the running condition of the vehicle. The power control section automatically stops a drive power source of the vehicle when the running condition of the vehicle satisfies a predetermined condition for determining a vehicle stop. In the vehicle control system, the power control section inhibits the automatic stop of the drive power source when the automatic mode of the brake control section is released.

A second aspect of the present invention relates to a vehicle control system which further includes an inclination detection section for detecting an inclination of a road surface on which the vehicle stops, in which the power control section inhibits the automatic stop of the drive power source when the automatic mode of the brake control section is released and the inclination detection section detects a predetermined inclination.

A third aspect of the present invention relates to a vehicle control system which further includes a diagnostic section for diagnosing a function of the brake control section and outputs a fail signal when an abnormal condition is detected, in which the power control section inhibits the automatic stop of the drive power source when the diagnostic section outputs the fail signal.

According to the present invention, an automatic stop of the drive power source is inhibited when the automatic mode of the brake control section is released. This makes it possible to prevent an automatic stop of the drive power source in a state in which the mechanical brake is released, and thus prevent unintentional movement of the vehicle.

On the other hand, an automatic stop of the drive power source can be inhibited when the automatic mode is released and a predetermined inclination is detected, thereby ensuring that unintentional movement of the vehicle caused by an inclination of the road surface is prevented.

Furthermore, according to the present invention, an automatic stop of the drive power source is inhibited when the diagnostic section for diagnosing the function of the brake control section outputs a fail signal, thereby preventing an automatic stop from being made in the presence of a failure or the like in the brake control section. This allows for preventing unintentional movement of the vehicle caused by loss in creep force on an inclining or declining road surface, thus providing improved reliability to the vehicle.

BRIEF DESCRIPTION OF THE DRAWINGS

These and other objects and advantages of the present invention will become clearly understood from the following description with reference to the accompanying drawings, wherein.

DETAILED DESCRIPTION OF THE PREFERRED EMBODIMENTS

The present invention provides a vehicle control system which prevents unintentional movement of the vehicle after the drive power source is automatically stopped. This challenge is solved by inhibiting an automatic stop of the engine when the automatic mode of operation of the electric parking brake is released or when a self-diagnostic function of the ECU of the electric parking brake controller detects a failure and outputs a fail signal.

First Embodiment

A description will now be made to a vehicle control system in accordance with a first embodiment of the present invention.

Figure 1:
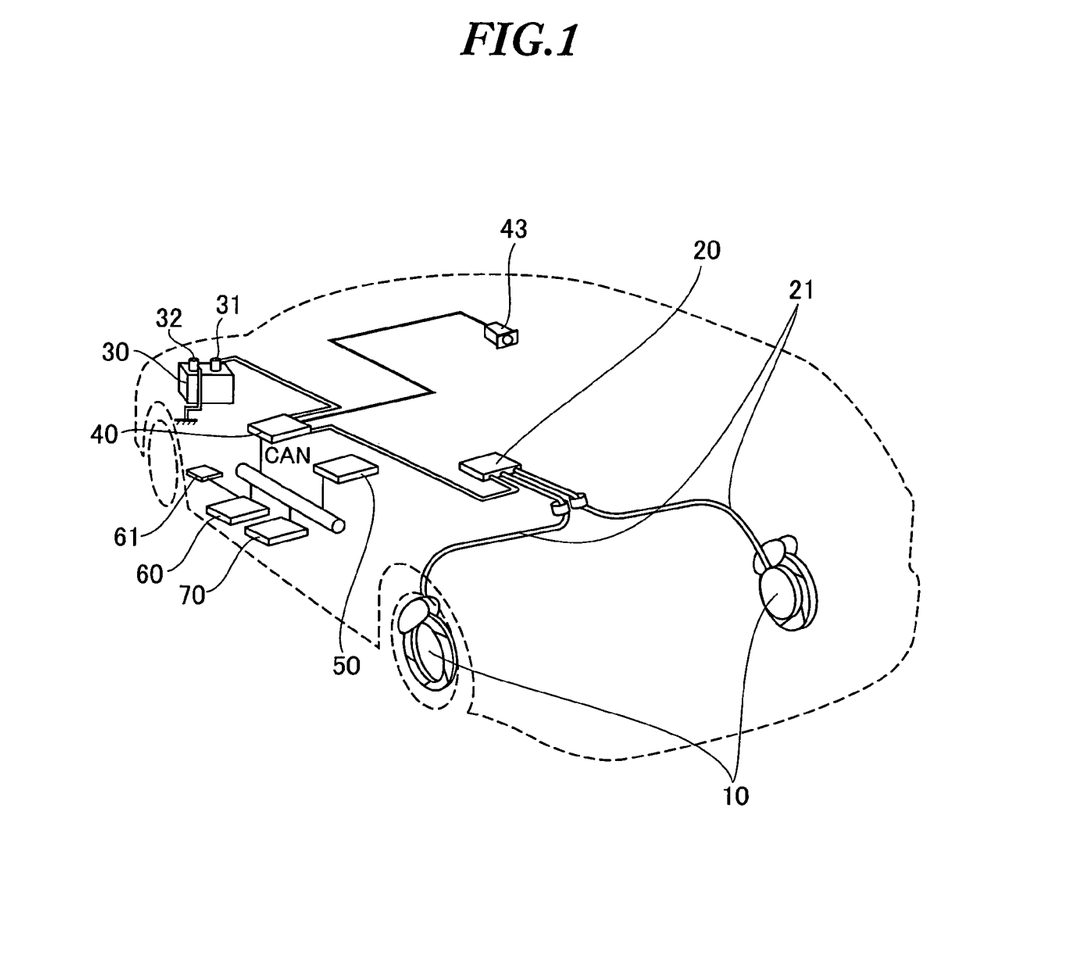
FIG. 1 is a schematic view illustrating the configuration of a vehicle control system in accordance with an embodiment of the present invention.
Figure 2:
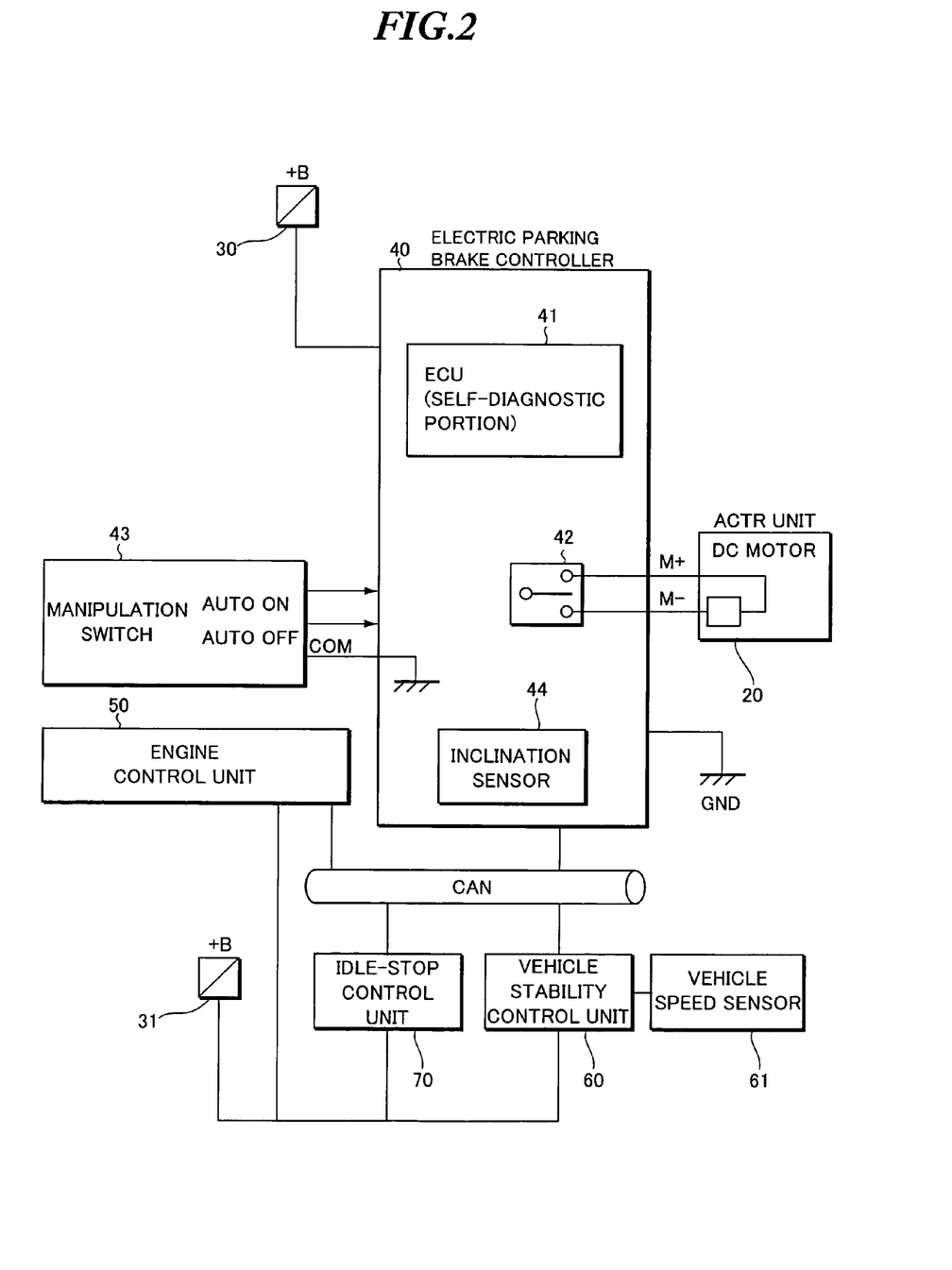
FIG. 2 is a block diagram illustrating the circuit configuration of the vehicle control system of FIG. 1.

FIG. 1 is a schematic view illustrating the configuration of the vehicle control system of this embodiment. FIG. 2 is a block diagram illustrating the circuit configuration of the vehicle control system.

The vehicle control system includes a parking brake 10, an actuator unit 20, a battery 30, an electric parking brake controller 40, an engine control unit 50, a vehicle stability control unit 60, and an idle-stop control unit 70.

On the other hand, the vehicle employed in this embodiment is a passenger automobile which incorporates a gasoline engine as its drive power source.

The parking brake 10 is a braking mechanism for applying brakes to the drive wheels of the vehicle in order to prevent unintentional movement of the vehicle, e.g., when the vehicle is parked or at a stop. The brake 10 is installed at each of the right and left rear wheel hubs of the vehicle. The parking brake 10 is a mechanical brake which includes a brake drum (not shown) disposed on the inner diameter side of the rotor of a disk brake used as the foot brake (main brake), and a brake shoe (not shown) to be pushed under pressure against the inner diameter side of the brake drum during a braking operation. The parking brake 10 is an electric parking brake driven by the actuator unit 20.

The actuator unit 20 drives the shoe of the parking brake 10 to provide transitions between the braking state in which the parking brake 10 produces braking force and the released state in which substantially no braking force is produced. The actuator unit 20 includes a parking brake cable 21 and is secured, e.g., to the floor panel section of the vehicle.

The actuator unit 20 reduces, e.g., the rotational force of a direct current (DC) motor through a reduction gear train to rotate the lead screw, allowing an equalizer screwed to the lead screw to pull or relax the parking brake cable 21.

The parking brake cable 21, which is disposed on each of the corresponding right and left parking brakes 10, is flexible enough to deform according to the stroke of a rear suspension (not shown). The parking brake cable 21 is pulled to drive the parking brake 10 into the braking state while being relaxed to drive the parking brake 10 into the released state.

The battery 30, or a rechargeable battery used as a main power source for the electrical system of the vehicle, produces a terminal voltage of 12 VDC, for example. The battery 30 has a plus terminal 31 and a minus terminal 32.

The plus terminal 31 is connected through wires (a harness) to the electric parking brake controller 40, the engine control unit 50, the vehicle stability control unit 60, and the idle-stop control unit 70.

The minus terminal 32 is grounded to the vehicle body.

The electric parking brake controller 40 serves as a brake control section for controlling the actuator unit 20 to provide transitions for the parking brake 10 between the released state and the braking state. The controller 40 can select between a manual mode and an automatic mode (hill hold mode). In the manual mode, a transition is provided from the released state to the braking state according to the manipulation carried out by a user such as the driver of the vehicle. In the automatic mode, a transition is automatically provided from the released state to the braking state based on the running condition of the vehicle when the vehicle is detected to be at a stop.

The electric parking brake controller 40 includes an ECU 41, a relay 42, an operation switch 43, and an inclination sensor 44, and can communicate, through a CAN communication system or a type of an on-board LAN, with the engine control unit 50, the vehicle stability control unit 60, and the idle-stop control unit 70.

The ECU 41 determines whether a braking operation is required for the parking brake 10, in response to an input from the operation switch 43 in the manual mode and a control signal from the idle-stop control unit 70 in the automatic mode. Based on the result of the determination, the ECU 41 controls the relay 42.

The ECU 41 also serves as a diagnostic section having a self-diagnostic function for self-diagnosis to check for a failure or whether the electric parking brake devices are properly functioning, including the electric parking brake controller 40, the parking brake 10, and the actuator unit 20. When a failure is detected by the self-diagnostic function, the ECU 41 outputs a fail signal or a signal indicative of the occurrence of a failure to the idle-stop control section 70.

In response to the control signal outputted by the ECU 41, the relay 42 supplies power to the actuator unit 20 to drive it. The relay 42 serves to reverse the polarity of the drive power in order to provide a transition for the parking brake 10 from the braking state to the released state and a transition from the released state to the braking state. Furthermore, the relay 42 is in a neutral state and thus in no electrical communication with the actuator unit 20 other than during driving of the actuator unit 20.

The operation switch 43 serves as a manipulation section for the user to provide a switching manipulation between the manual mode and the automatic mode and provide a manually selected manipulation input indicative of the braking state or the released state of the parking brake 10 in the manual mode. For example, the switch 43 includes a push button switch attached to an instrument panel (not shown) of the vehicle.

The inclination sensor 44 includes, e.g., an acceleration sensor for detecting the gravitational acceleration acting upon the vehicle in the longitudinal direction thereof, and is used to determine an inclination of the road surface on which the vehicle stops, based on the output therefrom. In response to the output from the inclination sensor 44, the ECU 41 sets the target braking force of the parking brake 10 so as to be capable of preventing unintentional movement of the vehicle due to an inclination of the road surface.

The engine control unit 50 collectively controls a power unit including a vehicle engine (drive power source) and its auxiliary components (not shown). For the engine being a typical gasoline engine, the engine control unit 50 provides control to each control parameter required for the operation of the engine such as the amount and timing of fuel injection, the timing of ignition, the opening of an electronically controlled throttle, the setting of the variable intake and exhaust system, and the supercharge pressure of the supercharger. The engine control unit 50 also controls the starter device for starting the engine.

The engine control unit 50 functions to stop and restart the engine based on an idle-stop activation signal or a control signal supplied from the idle-stop control unit 70.

The vehicle stability control unit 60, which includes a vehicle speed sensor 61, provides well-known anti-lock brake (ABS) control as well as well-known vehicle stability control for ensuring the stability of the vehicle by individually controlling the braking force of each drive wheel to inhibit excessive under steer and over steer.

The vehicle speed sensor 61 is provided at the hub section of each drive wheel and includes, e.g., a magnetic encoder for detecting the rotational speed of the corresponding drive wheel, to output a vehicle speed pulse signal according to the rotational speed of the drive wheel. The vehicle speed pulse signal outputted by the vehicle speed sensor 61 is transferred to each of the electric parking brake controller 40, the engine control unit 50, and the idle-stop control unit 70 via the vehicle stability control unit 60 and the CAN communication system.

The idle-stop control unit 70 detects, based on the running condition of the vehicle, that the vehicle transitioned from a running state to a standstill state, and then transfers the idle-stop activation signal to the engine control unit 50 in a standstill state to stop automatically (or idle stop) the engine.

In the idle-stop state, the idle-stop control unit 70 also outputs a control signal to the engine control unit 50 to automatically restart the engine, for example, when the driver follows a predefined procedure such as depressing the throttle pedal (not shown) in preparation for the launch of the vehicle.

Furthermore, in the first embodiment, the idle-stop control unit 70 performs the idle stop only when it is detected that the vehicle has transitioned to a standstill state and the electric parking brake controller 40 has selected the automatic mode.

Figure 3:
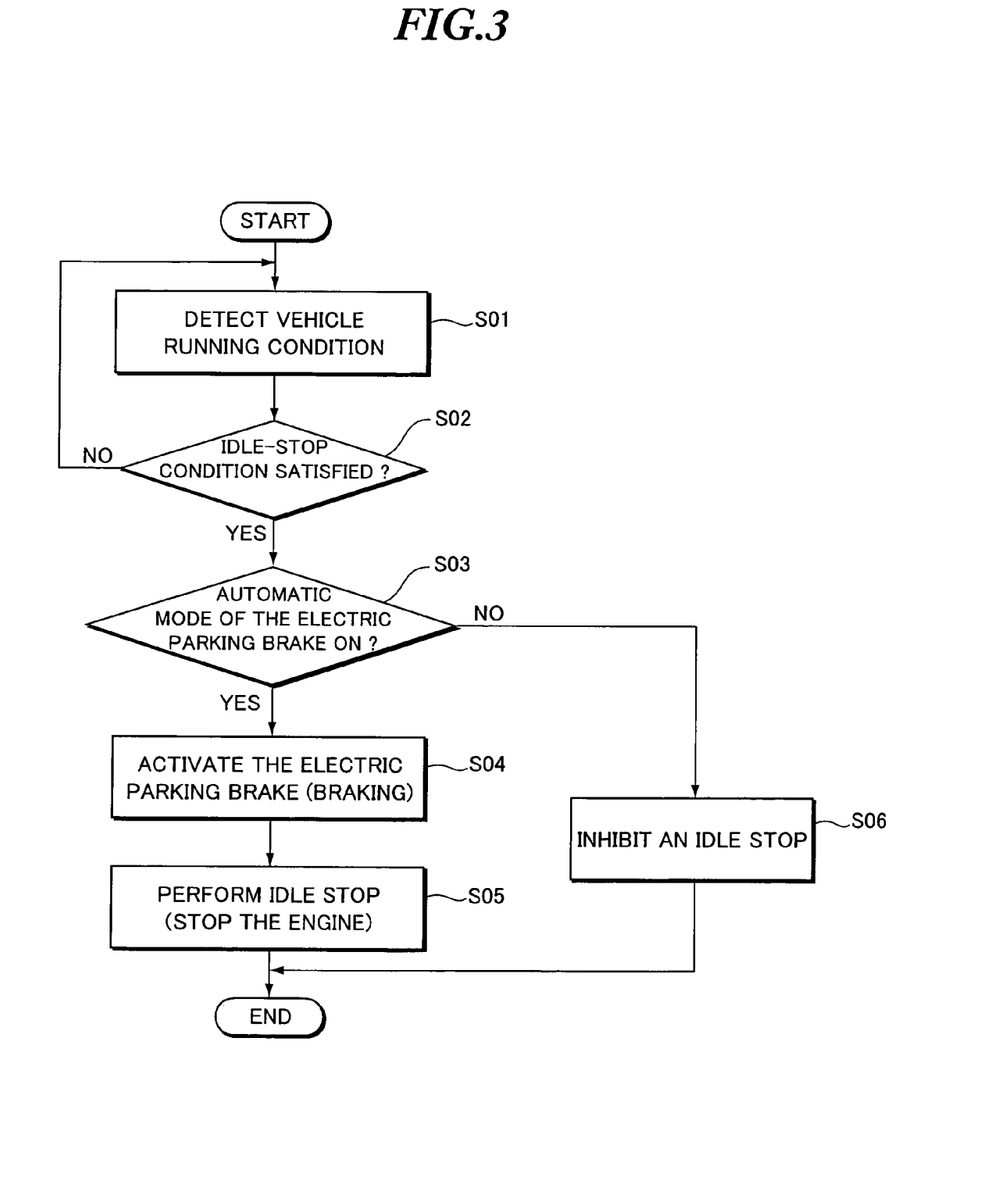
FIG. 3 is a flowchart showing the operation of the vehicle control system of FIG. 1 in accordance with a first embodiment.

A description will now be made to the operation of the aforementioned vehicle control system. FIG. 3 is a flowchart showing the operation of the vehicle control system related to the turning ON and OFF of the electric parking brake. The steps of the operation will be described below in the order in which they appear.

<Step S01: Detecting the Vehicle Running Condition>

The idle-stop control unit 70 detects the running conditions of the vehicle. Here, for example, the running conditions of the vehicle include the speed of the vehicle (vehicle speed) calculated based on the vehicle speed pulse signal outputted by the vehicle speed sensor 61 and the presence of a depression of the brake pedal (not shown) and the throttle pedal.

<Step S02: Determining if the Idle-Stop Condition is Met>

The idle-stop control unit 70 determines whether the running condition of the vehicle detected in Step S01 satisfies a predefined idle-stop condition. The defined idle-stop condition is to detect that the vehicle transitioned from a running state to a standstill state in which the engine is to be automatically stopped. For example, the idle-stop control unit 70 has to satisfy all the idle-stop conditions such as: (a) the state of a vehicle speed of 0 km/h lasting for a predetermined period of time or more; (b) the foot brake (not shown) being depressed;) (c) the throttle not being manipulated; and (d) no other abnormal conditions being detected in the vehicle.

If the idle-stop condition is satisfied, the process determines that the vehicle is at a standstill and then proceeds to Step S03. If not, the process returns to Step S01 to repeat the subsequent steps.

<Step S03: Determining the Automatic Mode of the Electric Parking Brake>

The idle-stop control unit 70 communicates with the electric parking brake control unit 40 via the CAN communication system to determine whether the electric parking brake control unit 40 selects the automatic mode.

Then, if the automatic mode is selected, the process proceeds to Step S04, whereas if the automatic mode is not selected but the manual mode is selected, the process proceeds to Step S06.

<Step S04: Activating the Electric Parking Brake>

The electric parking brake controller 40 controls the actuator unit 20 to allow the parking brake 10 to transition from the released state to the braking state. At this time, the target braking force of the parking brake 10 is set based on the output from the inclination sensor 44.

Then, after the parking brake 10 completely transitioned from the released state to the braking state and then the parking brake 10 comes to generate the target braking force, the electric parking brake 40 outputs a control signal indicative of the end of driving the parking brake to the idle-stop control unit 70. Then, the process proceeds to Step S05.

<Step S05: Performing Idle Stop (Automatic Stop of the Engine)>

The idle-stop control unit 70 receives the control signal outputted by the electric parking brake control unit 40, and then outputs (turns ON) the idle-stop activation signal or a control signal for requesting the engine control unit 50 to stop the engine.

In response to receiving the idle-stop activation signal, the engine control unit 50 stops the fuel injection by the injector (not shown) to stop the engine, thus ending the processing.

<Step S06: Inhibiting the Idle Stop>

The idle-stop control unit 70 inhibits the idle stop, so that the engine is allowed to operate while idling at the predetermined rpm therefor.

Figure 4:
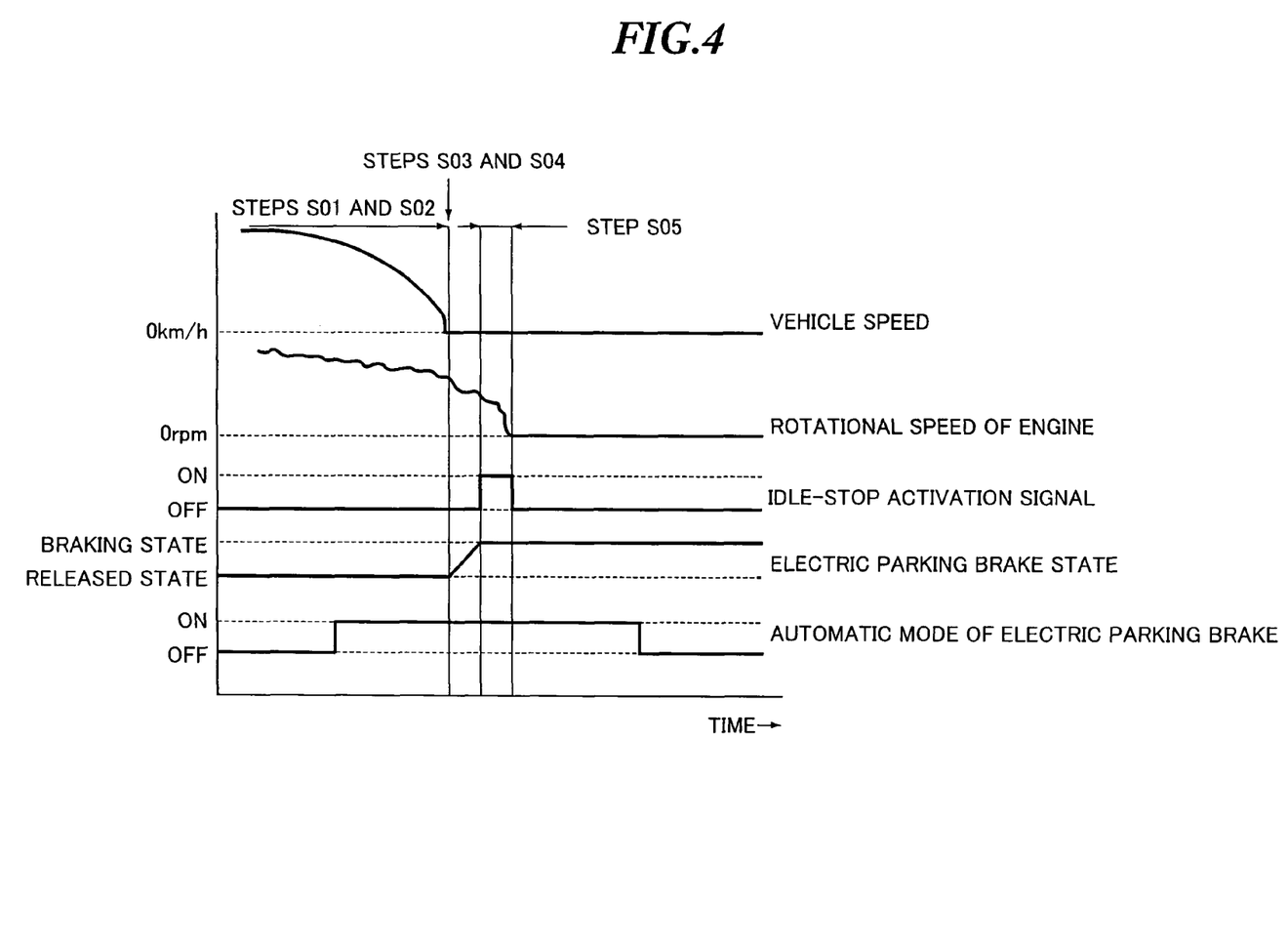
FIG. 4 is a graph showing the transition of each parameter when the automatic mode of the electric parking brake of FIG. 3 is selected.
Figure 5:
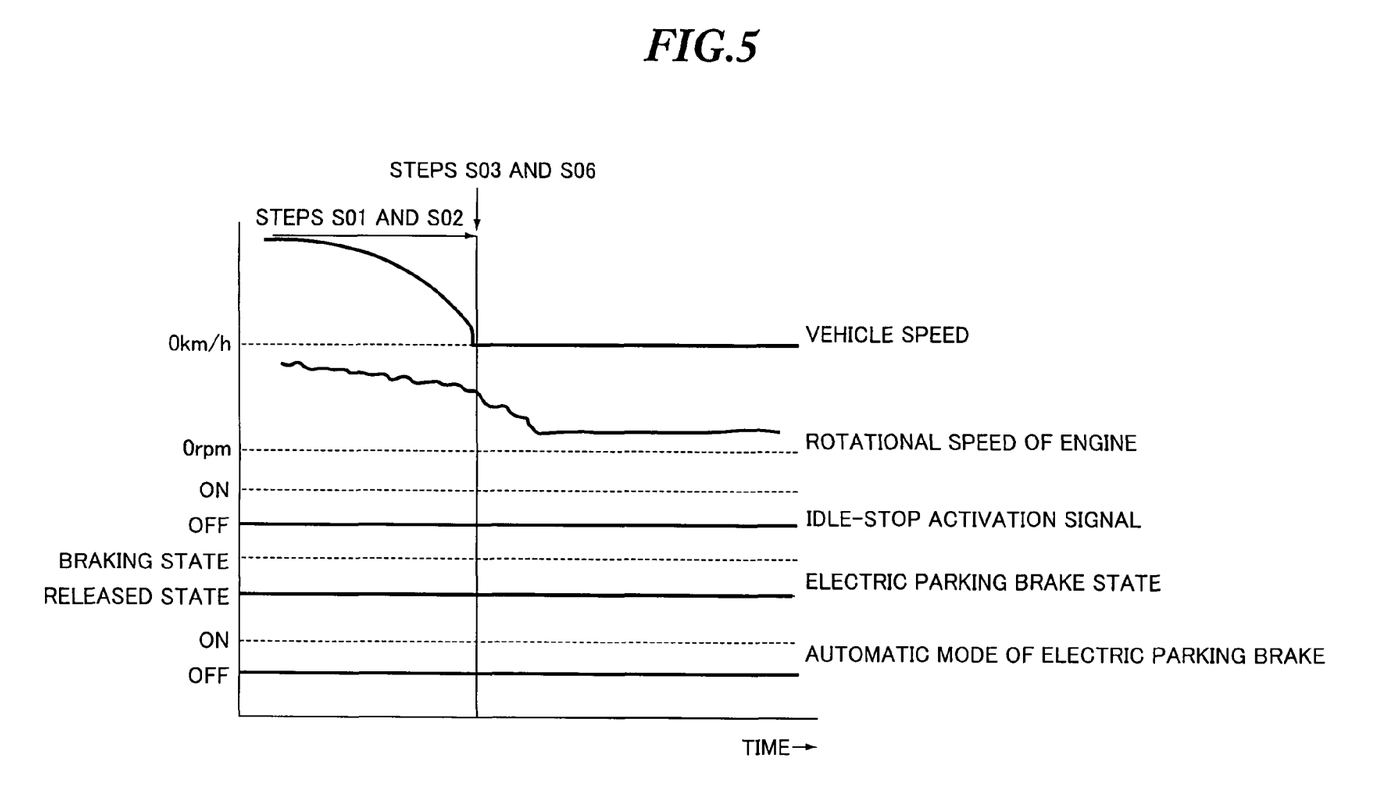
FIG. 5 is a graph showing the transition of each parameter when the automatic mode of the electric parking brake of FIG. 3 is released.

FIGS. 4 and 5 are graphs showing the transitions of the vehicle speed, the engine rpm, the idle-stop activation signal, the state of the electric parking brake, and the state of selection of the electric parking brake automatic mode when the vehicle transitions from a running state to a standstill state. The graphs show the state in which the automatic mode of the electric parking brake is selected and the state in which it is released, respectively.

As shown in FIG. 4, when the automatic mode is ON (selected), the vehicle speed is gradually reduced to 0 km/h, so that the vehicle is determined in Step S02 to be at a stop after a certain period of time. Immediately after that, the parking brake 10 is driven to start to transition from the released state to the braking state. Then, after the parking brake 10 is completely transitioned to the braking state, the idle-stop activation signal is outputted to stop the engine finally with its rotational speed being 0 rpm.

In contrast to this, when the automatic mode is OFF (released) as shown in FIG. 5, an idle stop is inhibited in Step S06 even when the vehicle is determined to be at a standstill, thereby allowing the idle-stop activation signal not to be outputted so that the engine remains operating. On the other hand, during this time, the electric parking brake is kept in the released state.

As described above, this embodiment inhibits an idle stop when the electric parking brake controller 40 selects the manual mode, thereby preventing the idle stop in the state in which the parking brake 10 is released. This in turn allows for preventing the vehicle from starting to move due to an inclination of the road surface or the like, thereby providing improved reliability to the vehicle as well as improved tolerance to mistakes in mode selection by the user to ensure safety.

Second Embodiment

A second embodiment is adapted such that the idle-stop control unit 70 performs an idle stop only when the vehicle is detected to transition to a standstill state and the ECU 41 of the electric parking brake controller 40 does not output the fail signal (or the fail signal is OFF).

Figure 6:
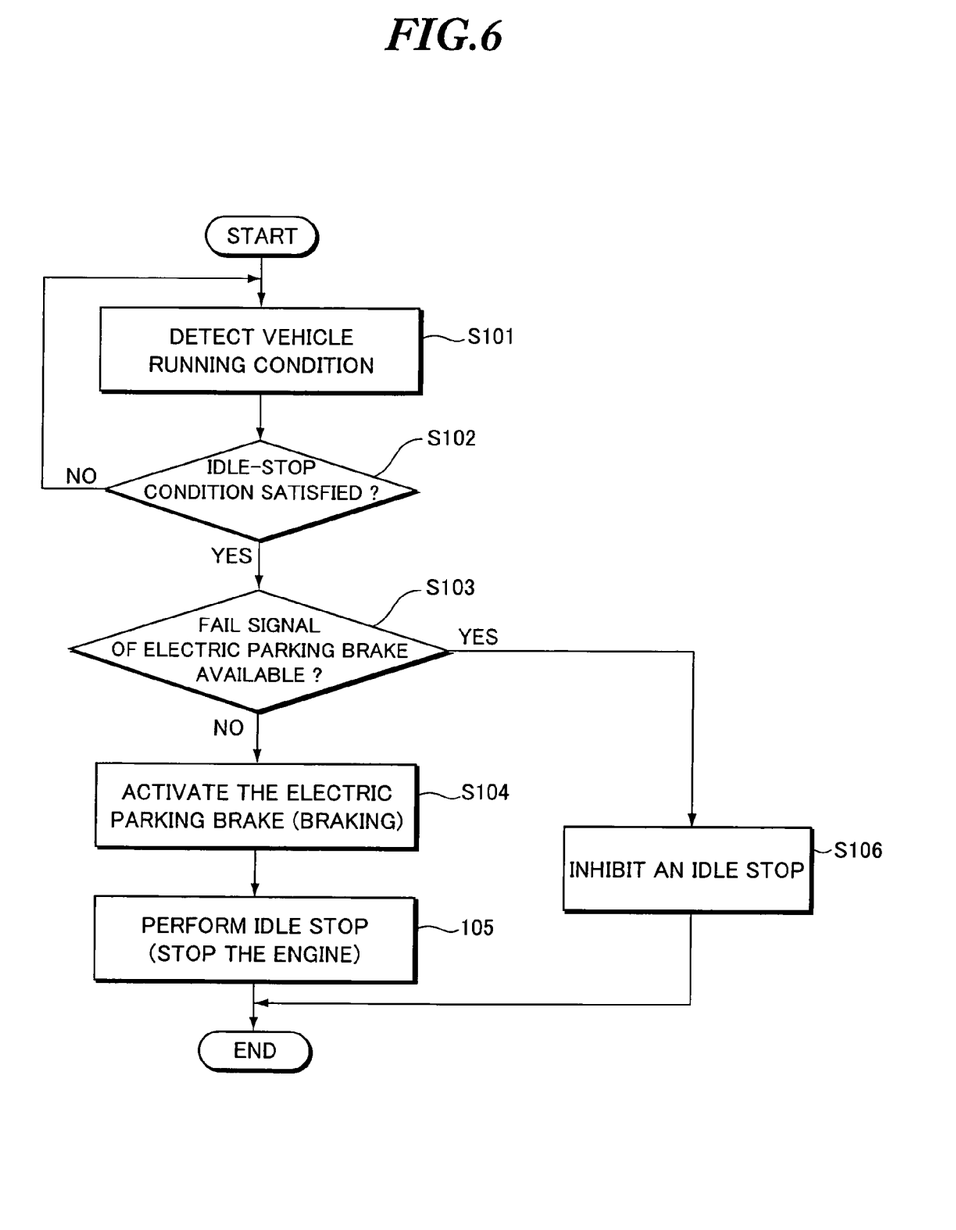
FIG. 6 is a flowchart showing the operation of the vehicle control system of FIG. 1 in accordance with a second embodiment.

A description will now be made to the operation of the vehicle control system described above. FIG. 6 is a flowchart showing the operation of the vehicle control system related to the presence or absence of the fail signal of the electric parking brake. The steps of the operation will be described below in the order in which they appear.

<Step S101: Detecting the Running Condition>

The idle-stop control unit 70 detects the running condition of the vehicle. Here, for example, the running conditions of the vehicle include the speed of the vehicle (vehicle speed) calculated based on the vehicle speed pulse signal outputted by the vehicle speed sensor 61 and the presence or absence of the depression of the brake pedal (not shown) and the throttle pedal.

<Step S102: Determining if the Idle-Stop Condition is Met>

The idle-stop control unit 70 determines whether the running condition of the vehicle detected in Step S101 satisfies a predefined idle-stop condition. The defined idle-stop condition is to detect that the vehicle transitioned from a running state to a standstill state in which the engine is to be automatically stopped. For example, the idle-stop control unit 70 has to satisfy all the idle-stop conditions such as: (a) the state of a vehicle speed of 0 km/h lasting for a predetermined period of time or more; (b) the foot brake (not shown) being depressed;) (c) the throttle not being manipulated; and (d) no other abnormal conditions being detected in the vehicle.

If the idle-stop condition is satisfied, the process determines that the vehicle is at a standstill and then proceeds to Step S103. If not, the process returns to Step S101 to repeat the subsequent steps.

<Step S103: Determining the Presence of the Fail Signal>

The idle-stop control unit 70 communicates with the electric parking brake control unit 40 via the CAN communication system to determine whether the ECU 41 of the electric parking brake control unit 40 outputs the fail signal.

Then, if the fail signal is not outputted, then the process proceeds to Step S104, whereas if the fail signal is outputted, the process proceeds to Step S106.

<Step S104: Activating the Electric Parking Brake>

The electric parking brake controller 40 controls the actuator unit 20 to allow the parking brake 10 to transition from the released state to the braking state. At this time, the target braking force of the parking brake 10 is set based on the output from the inclination sensor 44.

Then, after the parking brake 10 completely transitioned from the released state to the braking state and then the parking brake 10 comes to generate the target braking force, the electric parking brake 40 outputs a control signal indicative of the end of driving the parking brake to the idle-stop control unit 70. Then, the process proceeds to Step S105.

<Step S105: Performing Idle Stop (Automatic Stop of the Engine)>

The idle-stop control unit 70 receives the control signal outputted by the electric parking brake control unit 40, and then outputs (turns ON) the idle-stop activation signal or a control signal for requesting the engine control unit 50 to stop the engine.

In response to receiving the idle-stop activation signal, the engine control unit 50 stops the fuel injection by the injector (not shown) to stop the engine, thus ending the processing.

<Step S106: Inhibiting the Idle Stop>

The idle-stop control unit 70 inhibits the idle stop, so that the engine is allowed to operate while idling at the predetermined rpm therefor.

Figure 7:
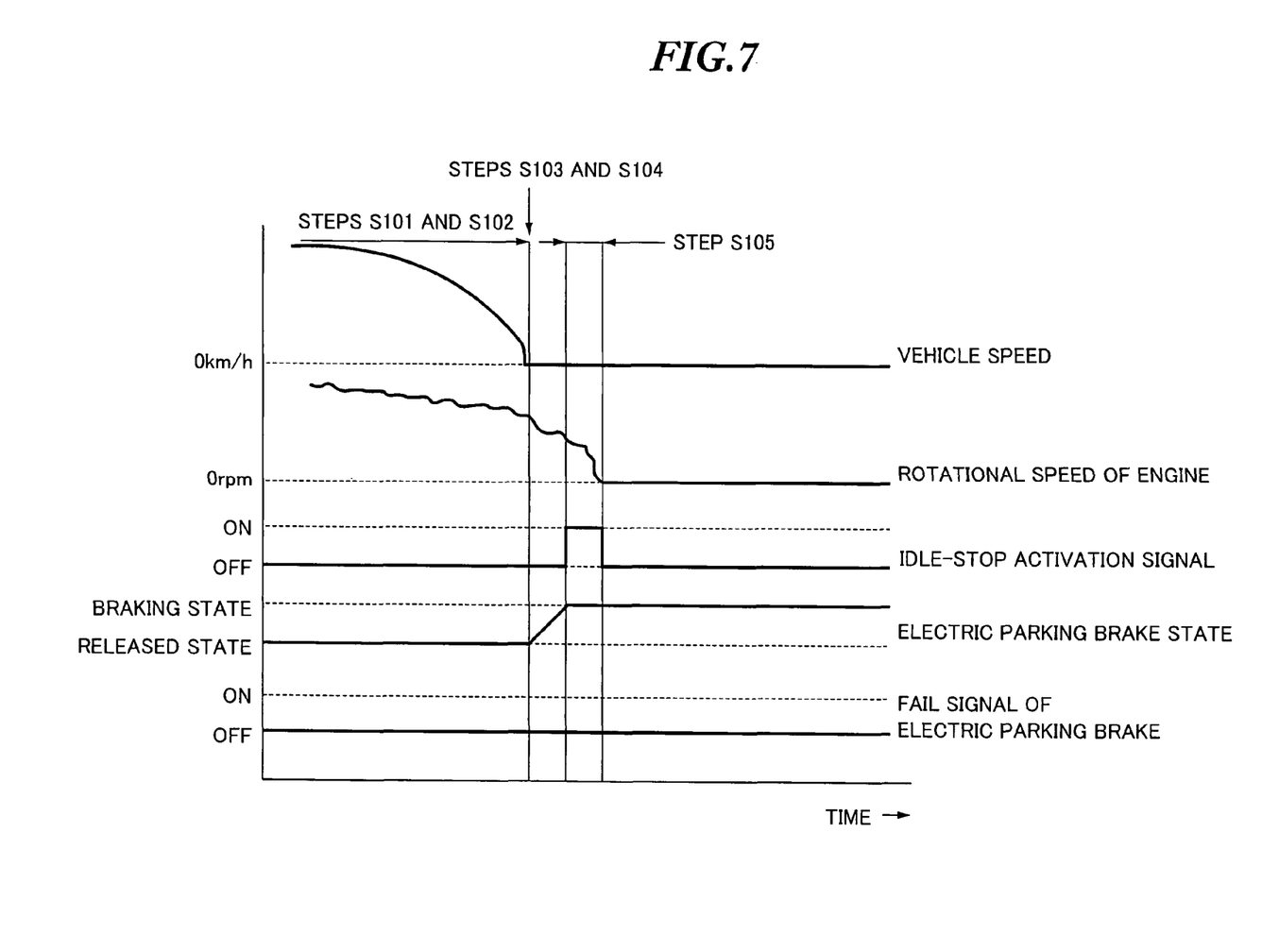
FIG. 7 is a graph showing the transition of each parameter when the result of a self-diagnosis of the electric parking brake of FIG. 6 is normal.
Figure 8:
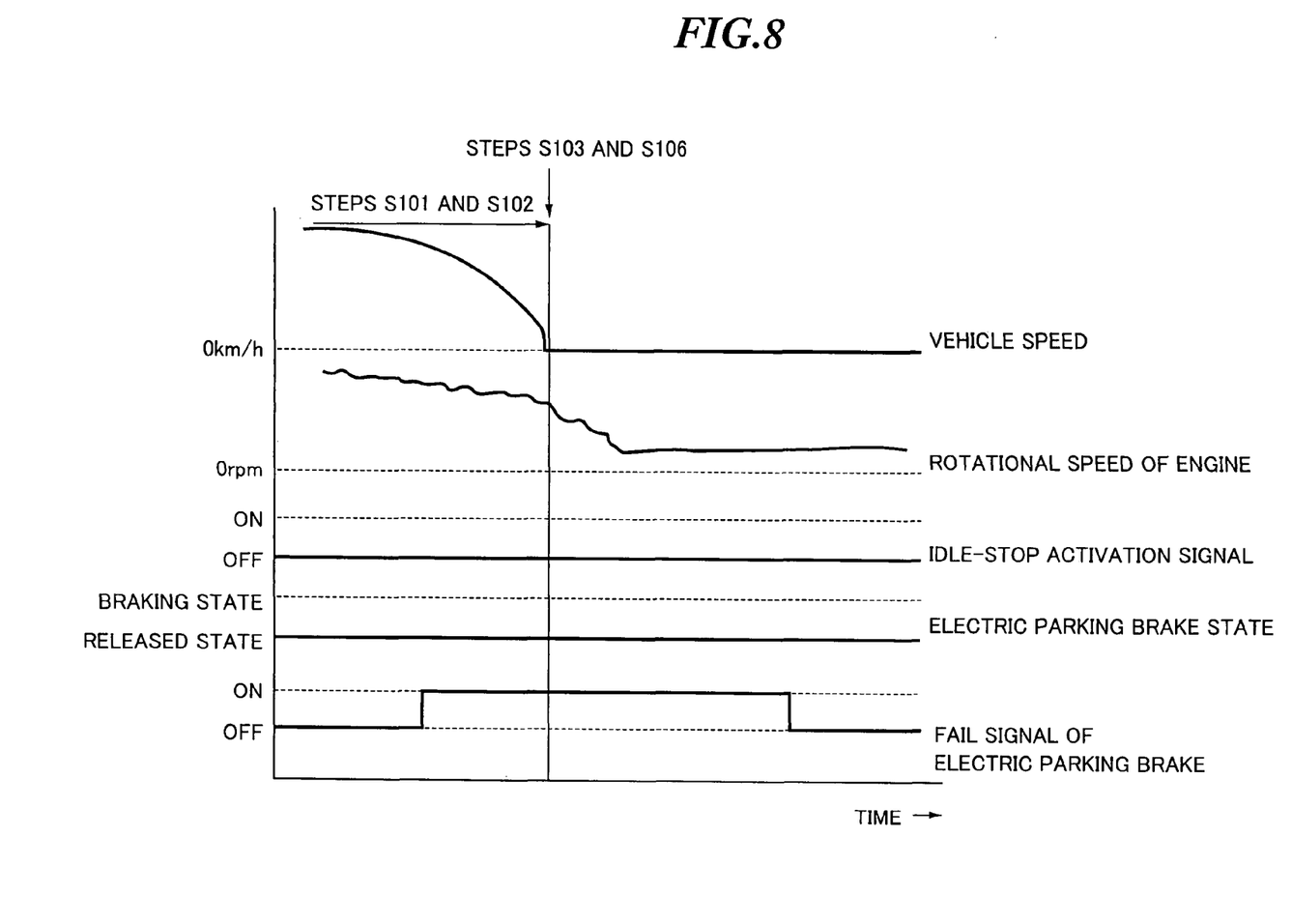
FIG. 8 is a graph showing the transition of each parameter when the result of a self-diagnosis of the electric parking brake of FIG. 6 is abnormal.

FIGS. 7 and 8 are graphs showing the transitions of the vehicle speed, the engine rpm, the idle-stop activation signal, the state of the electric parking brake, and the fail signal of the electric parking brake when the vehicle transitions from a running state to a standstill state. The graphs show the state in which the result of a self-diagnosis of the electric parking brake is normal (the fail signal is OFF) and the state in which it is abnormal (the fail signal is ON), respectively.

As shown in FIG. 7, when the fail signal is OFF, the vehicle speed is gradually reduced to 0 km/h, so that the vehicle is determined in Step S102 to be at a standstill after a certain period of time. Immediately after that, the parking brake 10 is driven to start to transition from the released state to the braking state. Then, after the parking brake 10 completely transitioned to the braking state, the idle-stop activation signal is outputted to stop the engine finally with its rotational speed being 0 rpm.

In contrast to this, when the fail signal is ON as shown in FIG. 8, an idle stop is inhibited in Step S106 even when the vehicle has been determined to be at a standstill, thereby allowing the idle-stop activation signal not to be outputted so that the engine remains operating. On the other hand, during this time, the electric parking brake is kept in the released state.

As described above, this embodiment inhibits an idle stop when the ECU 41 of the electric parking brake controller 40 outputs the fail signal, thereby preventing the idle stop in the event of failure of the electric parking brake device. This in turn allows for preventing the vehicle from starting to move due to an inclination of the road surface or the like, thereby providing improved reliability to the vehicle.

Modified Examples

The present invention is not limited to the aforementioned embodiments, and various modifications and variations can be made thereto without departing from the scope of the present invention.

(1) The first and second embodiments inhibit an automatic stop of the drive power source when the automatic mode of the brake control section is released or when the diagnostic section outputs a fail signal. However, the condition for inhibiting the automatic stop of the drive power source is not limited to this condition but may be changed as appropriate. For example, an inclination sensor for detecting an inclination of the road surface may be used to inhibit the automatic stop of the drive power source only when the automatic mode is released and the inclination of the road surface is equal to or greater than a predetermined inclination. Alternatively, the automatic stop of the drive power source may be inhibited only when the diagnostic section outputs the fail signal and the inclination of the road surface is equal to or greater than a predetermined inclination.

This further ensures that unintentional movement of the vehicle due to an inclination of the road surface can be prevented. This also allows for idle stops on an extended range of areas such as on flat roads where such unintentional movement of the vehicle is unlikely to occur, thereby reducing fuel consumption. In this case, the method for detecting an inclination of a road surface is not limited to the one in the aforementioned embodiments by which G is detected in the longitudinal direction of the vehicle, but another method may also be employed. For example, a comparison may be made between the fluid pressure of the foot brake and the vehicle speed to determine the inclination.

(2) The aforementioned embodiments employ a gasoline engine as the drive power source, but the drive power source is not limited thereto and may be another one. For example, it may be a diesel engine, a hydrogen engine, or a hybrid system incorporating one of these engines and an electric motor in combination.

(3) The parking brake of the embodiments has a drum disposed on the inner diameter side of a brake disc for the foot brake; however, the parking brake may be of another type. For example, the parking brake may be formed such that a disk brake and a drum brake for the foot brake and its frictional material is used together to be integrated with the parking brake.

(4) The parking brake of the embodiments employs an actuator secured on the vehicle body side to drive the parking brake via a parking brake cable; however, the invention is not limited thereto. For example, the invention is also applicable to a so-called built-in electric parking brake in which an electric actuator is provided on the wheel hub side to be integrated with the parking brake.

While the present invention has been described in connection with the preferred specific embodiments thereof, it will be understood that the description is intended to illustrate and does not limit the scope of the present invention, which is defined just by the following claims.

What is claimed is:

1. A vehicle control system comprising:
a brake control section configured for controlling an actuator to provide a transition between a braking state and a released state of a mechanical brake for applying a braking force to a wheel of a vehicle, and the brake control section being configured to select between a non-automatic mode and an automatic mode, and wherein, upon selection of the automatic mode, the mechanical brake is configured for automatically transitioning from the released state to the braking state in response to a running condition of the vehicle;
a power control section configured for performing an automatic stopping of a running fuel or running energy source feed supply to a vehicle driving power source when the running condition of the vehicle satisfies a predetermined condition for determining that the vehicle is in a vehicle stop condition;
a manipulation section in communication with the brake control section whereby, in response to a manual input, the brake control section is configured to select one of the non-automatic mode and the automatic mode, and wherein the non-automatic mode is a manual mode for manually selecting one of the released state and the braking state of the mechanical brake by a vehicle user's operation; and
an inclination detection section for detecting an inclination of a road surface on which the vehicle stops,
wherein the power control section prevents the vehicle from starting to move due to an inclination of the road surface by inhibiting the automatic stopping of the running fuel or running energy source feed supply when the manipulation section is set to select the non-automatic mode of the brake control section and additionally the inclination detection section detects a predetermined inclination.

2. A vehicle control system, comprising:
a brake control section configured for
controlling transition of a mechanical brake between a released state and a braking state, the braking state being one wherein a braking force is applied to at least one vehicle wheel, and
switching between selection modes comprising a selection of a manual mode wherein the mechanical brake is configured for transitioning between the released state and the braking state in response to a vehicle user's operation, and a selection of an automatic mode wherein the mechanical brake is configured for automatically transitioning from the released state to the braking state in response to a running condition of the vehicle;
a power control section configured to control an automatic stopping of a drive power source based on the running condition of the vehicle, the drive power source being a power source that delivers drive power to at least one vehicle wheel;
a manipulation section in communication with the brake control section and configured to switch the brake control section between the selection modes comprising the selection of the manual mode and the selection of the automatic mode in response to a manual input; and
an inclination detection section for detecting an inclination of a road surface on which the vehicle stops,
wherein the power control section is configured to
prevent the vehicle from starting to move due to an inclination of the road surface by inhibiting the automatic stopping of the drive power source when the brake control section is set to the manual selection and additionally the inclination detection section detects a predetermined inclination, and
carry out the automatic stopping of the drive power source when the running condition of the vehicle satisfies a predetermined condition for determining that the vehicle is in a vehicle stop condition, and the brake control section is set to the automatic selection.

3. The vehicle control system according to claim 2, wherein
the power control section is configured to carry out the automatic stopping of the drive power source only when the running condition of the vehicle satisfies the predetermined condition for determining that the vehicle is in the vehicle stop condition, and the brake control section is set to the automatic selection.

4. The vehicle control system according to claim 2, wherein
the power control section is configured to carry out the automatic stopping of the drive power source after the mechanical brake transitions from the released state to the braking state.

5. The vehicle control system according to claim 2, wherein
the brake control section is configured to control the transition of a parking brake as the mechanical brake.

6. The vehicle control system of claim 2, wherein
the brake control section is configured to control the transition of a parking brake as the mechanical brake, and
the brake control section is configured to control transition of the parking brake in an operation mode that is free of foot brake activation and includes adjustment of a wheel contact brake component.

7. The vehicle control system according to claim 2, wherein
the drive power source is a vehicle engine.

8. The vehicle control system according to claim 2, wherein
the brake control section is configured for controlling an actuator to transition a mechanical brake that is configured for installation on a vehicle wheel between the braking state and the release state.

9. The vehicle control system according to claim 2, wherein
the drive power source is one of an engine and an electric motor, and
the power control section is configured to carry out the automatic stopping of the drive power source by stopping a fuel supply to the engine when the drive power source is an engine, and stopping an electrical energy supply to the electric motor when the drive power source is an electric motor.

10. The vehicle control system according to claim 2, wherein
the power control section is configured to carry out the automatic stopping of the drive power source by stopping a running fuel or a running energy supply to the drive power source.

11. A vehicle control system, comprising:
a braking mechanism that is adjustable between a vehicle wheel braking state and a vehicle wheel release state;
a parking brake controller configured to selectively place the braking mechanism in the braking state or the release state;
a power control section configured to control an automatic stopping of a drive power source of the vehicle based on a running condition of the vehicle, the drive power source being a source of drive power for at least one vehicle wheel; and
an inclination detection section for detecting an inclination of a road surface on which the vehicle stops, wherein
the parking brake controller is in communication with the power control section and the parking brake controller comprises a diagnostic portion configured to determine whether a manual braking mode or an automatic braking mode is selected, the manual braking mode being a mode wherein the braking mechanism is configured to transition between the release state and the braking state based on a vehicle user input, and the automatic braking mode being a mode wherein the braking mechanism is configured to permit an automatic transition from the release state to the braking state based on a determination by the diagnostic portion that the automatic braking mode is selected,
the power control section is configured to
carry out the automatic stopping of the drive power source when a running condition of the vehicle satisfies a predetermined condition for determining that the vehicle is in a vehicle stop condition, and the diagnostic portion determines that the automatic braking mode is selected, and
prevent the vehicle from starting to move due to an inclination of the road surface by inhibiting the automatic stopping of the drive power source, despite a running condition of the vehicle satisfying the predetermined condition for determining that the vehicle is in a vehicle stop condition, when the diagnostic portion determines that the manual braking mode is selected and additionally the inclination detection section detects a predetermined inclination, and
the power control section is configured such that, when carrying out the automatic stopping of the drive power source, the drive power source is stopped after the braking mechanism transitions from the released state to the braking state.

12. The vehicle control system according to claim 11, further comprising
a manipulation switch that is configured for a vehicle user adjustment to signal to the parking brake controller either an automatic braking mode "ON" selection or an automatic braking mode "OFF" selection.

13. The vehicle control system according to claim 12, wherein
the manipulation switch is configured for attachment to an instrument panel of the vehicle.

14. The vehicle control system according to claim 11, wherein
the power control section communicates with an idle-stop control unit for determining when the running condition of the vehicle satisfies a predetermined condition for determining that the vehicle is in the vehicle stop condition,
the idle-stop control unit being configured to receive information indicative of vehicle speed, vehicle brake pedal position, and vehicle throttle status, and
the power control section is configured, when carrying out the automatic stopping of the drive power source, to stop the drive power source in conjunction with an idle-stop condition of the vehicle.

15. The vehicle control system according to claim 11, wherein
the parking brake controller is in communication with a parking brake as the braking mechanism, and
the parking brake controller is configured to control transition of the parking brake in an operation mode that is free of foot brake activation and includes adjustment of a wheel contact brake component.

16. The vehicle control system according to claim 11, wherein
the power control section is configured to carry out the automatic stopping of the drive power source by stopping a running fuel or a running energy supply to the drive power source.

17. A vehicle control system, comprising:
a brake controller that is configured to transition a parking brake between a braking state and a non-braking state, with transition of the parking brake including the adjustment of a wheel contact brake component;
an operation switch that is settable by a vehicle user to one of an automatic braking mode "ON" setting and an automatic braking mode "OFF" setting;
an idle stop control unit that is configured to detect a running condition of the vehicle;
a power control section that is configured to communicate with the idle stop control unit, and to direct an automatic stopping of a drive power source, the drive power source being a source of vehicle power including a source of drive power to at least one vehicle wheel; and
an inclination detection section for detecting an inclination of a road surface on which the vehicle stops, wherein the power control section is configured to
- carry out the automatic stopping of the drive power source when (a) the idle stop control unit determines the running condition of the vehicle satisfies a predetermined condition for determining that the vehicle is in a vehicle stop condition, and (b) the operation switch is set to the automatic braking mode "ON" setting; and
- prevent the vehicle from starting to move due to an inclination of the road surface by inhibiting the automatic stopping of the drive power source when the operation switch is set to the automatic braking mode "OFF" setting and additionally the inclination detection section detects a predetermined inclination, despite a determination by the idle stop control unit that the running condition of the vehicle satisfies the predetermined condition for determining that the vehicle is in the vehicle stop condition, and the brake controller is configured to control transition of the parking brake between the braking state and the non-braking state based on a manual input by a user when the operation switch is set to the automatic braking mode "OFF" setting.

18. The vehicle control system of claim 17, wherein
the brake controller is in communication with the idle stop control unit and the operation switch, and
the brake controller includes a diagnostic section configured to determine whether the operation switch is in the automatic braking mode "OFF" setting or the automatic braking mode "ON" setting.

19. The vehicle control system of claim 18, wherein
the diagnostic section of the brake controller is configured to detect a determination by the idle stop control section that the vehicle running condition satisfies the predetermined condition for determining that the vehicle is in the vehicle stop condition; and
the brake controller is configured, upon the diagnostic section detecting a determination by the idle stop control section that the vehicle running condition satisfies the predetermined condition for determining that the vehicle is in the vehicle stop condition, to determine whether the operation switch is in the automatic braking mode "OFF" setting or the automatic braking mode "ON" setting.

20. The vehicle control system of claim 17, wherein
the brake controller is configured to direct a brake actuator to activate a parking brake that comprises a component installed on at least one vehicle wheel.

21. The vehicle control system of claim 17, wherein
the operation switch is configured for attachment to an instrument panel of the vehicle.

22. The vehicle control system according to claim 17, wherein
the drive power source is one of an engine and an electric motor, and wherein
the power control section is configured to carry out the automatic stopping of the drive power source by stopping a fuel supply to the engine when the drive power source is an engine, and stopping an electrical energy supply to the electric motor when the drive power source is an electric motor.

23. The vehicle control system according to claim 17, wherein
the drive power source is one of an engine and an electric motor, and
the power control section is configured to carry out the automatic stopping of the drive power source by stopping a rotational operation in the engine or the electric motor.

24. The vehicle control system according to claim 17, wherein
the power control section is configured to carry out the automatic stopping of the drive power source by stopping a running fuel or a running energy supply to the drive power source.

* * * * *